US012565589B2

(12) United States Patent
Tashiro et al.

(10) Patent No.: US 12,565,589 B2
(45) Date of Patent: Mar. 3, 2026

(54) PRIMER COMPOSITION

(71) Applicant: CHUGOKU MARINE PAINTS, LTD., Otake (JP)

(72) Inventors: Shinichi Tashiro, Otake (JP); Hiroyuki Takaki, Otake (JP); Atsushi Aoi, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 141 days.

(21) Appl. No.: 18/551,222

(22) PCT Filed: Mar. 23, 2022

(86) PCT No.: PCT/JP2022/013492

§ 371 (c)(1),
(2) Date: Sep. 19, 2023

(87) PCT Pub. No.: WO2022/202897

PCT Pub. Date: Sep. 29, 2022

(65) Prior Publication Data

US 2024/0182721 A1 Jun. 6, 2024

(30) Foreign Application Priority Data

Mar. 26, 2021 (JP) ................................ 2021-053104

(51) Int. Cl.

| | |
|---|---|
| ***C09D 5/00*** | (2006.01) |
| ***C09D 7/20*** | (2018.01) |
| ***C09D 7/40*** | (2018.01) |
| ***C09D 133/06*** | (2006.01) |
| ***C09D 133/10*** | (2006.01) |

(52) U.S. Cl.

CPC ............... *C09D 5/002* (2013.01); *C09D 7/20* (2018.01); *C09D 7/70* (2018.01); *C09D 133/064* (2013.01); *C09D 133/10* (2013.01)

(58) Field of Classification Search

CPC . C09D 5/002; C09D 7/20; C09D 7/70; C09D 133/064; C09D 133/10

USPC ...................................................... 106/166.7

See application file for complete search history.

(56) References Cited

U.S. PATENT DOCUMENTS

| | | | |
|---|---|---|---|
| 10,563,082 | B2 | 2/2020 | Yamasaki et al. |
| 11,390,760 | B2 | 7/2022 | Niimoto |
| 2006/0257671 | A1 | 11/2006 | Yahkind |
| 2019/0085177 | A1 | 3/2019 | Niimoto |
| 2019/0382611 | A1 | 12/2019 | Yamasaki et al. |
| 2021/0309821 | A1 | 10/2021 | Suzuki et al. |

FOREIGN PATENT DOCUMENTS

| | | | | | |
|---|---|---|---|---|---|
| CN | 1771097 | A | | 5/2006 | |
| CN | 101376684 | A | | 3/2009 | |
| CN | 104559502 | A | | 4/2015 | |
| CN | 107022273 | A | | 8/2017 | |
| CN | 108884357 | A | | 11/2018 | |
| EP | 0 990 682 | A1 | | 4/2000 | |
| EP | 1 947 153 | A1 | | 7/2008 | |
| EP | 2 009 071 | A1 | | 12/2008 | |
| JP | 2000-037650 | A | | 2/2000 | |
| JP | 2000-37658 | A | | 2/2000 | |
| JP | 2000-37659 | A | | 2/2000 | |
| JP | 2000037658 | A | * | 2/2000 | |
| JP | 2001-139816 | A | | 5/2001 | |
| JP | 2001-181509 | A | | 7/2001 | |
| JP | 2016016164 | A | * | 2/2016 | |
| JP | 2017132960 | A | * | 8/2017 | ........... C09D 5/1625 |
| JP | 2019-167389 | A | | 10/2019 | |
| TW | 202106817 | A | * | 2/2021 | ........... C09D 167/00 |
| WO | WO 99/33927 | A1 | | 7/1999 | |
| WO | WO-2004/078365 | A1 | | 9/2004 | |
| WO | WO 2017/159740 | A1 | | 9/2017 | |
| WO | WO 2018/135418 | A1 | | 7/2018 | |
| WO | WO 2020/022334 | A1 | | 1/2020 | |
| WO | WO 2020/101648 | A1 | | 5/2020 | |

OTHER PUBLICATIONS

Takehara Kagaku Kogyo Co. LTD. (Year: 2022).*
International Search Report & Written Opinion issued Jun. 21, 2022 in PCT/JP2022/013492, (with English translation), 15 pages.
Extended European Search Report dated Jun. 10, 2025, issued for corresponding European Patent Application No. 22775679.8, 11 pages.
Combined Chinese Office Action and Search Report issued Nov. 20, 2024 in Chinese Patent Application No. 202280017738.1 (with English translation of Category of Cited Documents), 8 pages.
Korean Decision to Grant dated Dec. 22, 2025, in corresponding Korean Patent Application No. 10-2023-7036188 (with English Translation) (3 pages).

* cited by examiner

*Primary Examiner* — James E Mcdonough
(74) *Attorney, Agent, or Firm* — Oblon, McClelland, Maier & Neustadt, L.L.P.

(57) ABSTRACT

A primer composition may include an olefin-based resin (A), and a flaky pigment (B), and satisfy: (1) the primer composition contains a water-immiscible organic solvent, the pigment (B) has an average particle size of ≥25 μm and is present in 17+ wt. %, based on total primer composition solids; (2) the primer composition contains a water-immiscible organic solvent, the pigment (B) has an average particle size of <25 μm is present in 42+ wt. %, based on total primer composition solids, or (3): the primer composition contains water, the resin (A) is a water-based resin, and a pigment (B) content is 50 wt. % or higher based on total primer composition solids. Such a primer composition can be used in a primer coating film, a layered antifouling coating film, a method for producing a primer coated substrate, or a method for producing a layered antifouling coated substrate.

14 Claims, No Drawings

PRIMER COMPOSITION

CROSS-REFERENCE TO RELATED APPLICATIONS

The present application is the national stage of international application PCT/JP2022/013492, filed on Mar. 23, 2022, and claims the benefit of the filing date of Japanese Appl. No. 2021-053104, filed on 26 Mar. 2021.

TECHNICAL FIELD

One embodiment of the present invention relates to a primer composition, a primer coating film, a layered antifouling coating film, a method for producing a substrate with a primer coating film, or a method for producing a substrate with a layered antifouling coating film.

BACKGROUND ART

A substrate such as an offshore structure and an offshore power generation facility is usually a structure made of steel, and is installed in an environment with severe corrosion and fouling conditions. Because of this, heavy anticorrosive coating material and further antifouling coating material are applied and used.

In recent years, plastic members that are less likely to corrode are increasingly used in some of these structures. Also to such a plastic member, an antifouling coating material is required to be applied. However, even when an antifouling coating material is directly applied to a plastic member, the resulting antifouling coating film has poor adhesion to the member. Thus, a primer coating material is usually applied to the plastic member, an intermediate coating material (binder coating material) is further applied, and then the antifouling coating material is applied.

When the conventional primer coating material is used, a primer coating film has been formed on a plastic substrate by performing baking treatment through heating in order to obtain sufficient adhesion to the substrate.

Not only does such a baking treatment cause detrimental effects such as deformation and shrinkage of the substrate, but also performing the treatment, for example, complicates the process and increases the cost. Thus, development of a primer coating material that adheres to a plastic substrate without performing the baking treatment is required.

As a primer coating material that adheres to a plastic substrate without performing baking treatment, a primer coating material containing chlorine (containing a chlorinated product) is known. A plastic member is often incinerated and discarded after the end of its use period, but when the member includes a primer coating film containing chlorine at the time of incineration and disposal, there is a risk of generating a harmful gas such as hydrogen chloride gas.

As a primer coating material that adheres to a plastic substrate without performing a baking treatment, for example, primer coating materials described in Patent Literatures 1 and 2 are also known.

CITATION LIST

Patent Literature

Patent Literature 1: WO 2018/135418 A
Patent Literature 2: JP 2019-167389 A

SUMMARY OF INVENTION

Technical Problem

However, a primer coating film formed from a conventional primer coating material such as the coating material described in the patent literature does not have sufficient adhesion to a plastic substrate, and there is room for improvement in this respect.

As described above, after the primer coating material is applied, an intermediate coating material or an antifouling coating material is applied. Adhesion between a primer coating film formed from a conventional primer coating material and an antifouling coating film formed from an antifouling coating material is poor. Therefore, the intermediate coating material is applied in order to improve adhesion between the primer coating film and the antifouling coating film, but it is preferable not to use an intermediate coating material from the viewpoints of, for example, simplification of the process and economy.

However, it has been found that when an antifouling coating film is formed on a primer coating film formed from a conventional primer coating material such as the coating material described in the Patent Literature, the primer coating film has poor adhesion, and peeling easily occurs between the substrate and the primer coating film or between the primer coating film and the antifouling coating film.

One embodiment of the present invention provides a primer composition capable of forming a primer coating film excellent in adhesion to a plastic substrate without performing baking treatment by heating, and capable of forming a primer coating film that, even when an antifouling coating film (particularly, a silicone resin-based antifouling coating film) is formed on the primer coating film, is less likely to generate peeling between the substrate and the primer coating film and between the primer coating film and the antifouling coating film.

Solution to Problem

As a result of intensive studies on a method for solving the above problems, it has been found that the above problems can be solved by a specific composition, and this finding has led to completion of the present invention.

A configuration example of the present invention is as follows.

<1> A primer composition including: an olefin-based resin (A) (olefin resin (A)); and a flaky pigment (B), and satisfying any one of conditions 1 to 3 below:

the condition 1: the primer composition contains an organic solvent (C) immiscible with water, the flaky pigment (B) has an average particle size of 25 μm or larger, and a content of the flaky pigment (B) is 17% by mass or higher based on 100% by mass of a solids content in the primer composition;

the condition 2: the primer composition contains an organic solvent (C) immiscible with water, the flaky pigment (B) has an average particle size of less than 25 μm, and a content of the flaky pigment (B) is 42% by mass or higher based on 100% by mass of a solids content in the primer composition; and the condition 3: the primer composition contains water (D), the olefin-based resin (A) is a water-based resin (water resin), and a content of the flaky pigment (B) is 50% by mass or higher based on 100% by mass of a solids content in the primer composition.

<2> The primer composition according to <1>, in which the flaky pigment (B) is one or more selected from the group consisting of talc, mica, glass flakes, and aluminum flakes.

<3> The primer composition according to <1> or <2>, in which the olefin-based resin (A) contains substantially no chlorine.

<4> The primer composition according to any one of <1> to <3>, in which the olefin-based resin (A) includes a structure derived from maleic anhydride and a structure derived from a (meth)acrylic compound.

<5> The primer composition according to any one of <1> to <4>, in which when the primer composition satisfies the condition 1, a pigment volume concentration (PVC) in the primer composition is 10 to 60%, when the primer composition satisfies the condition 2, a pigment volume concentration (PVC) in the primer composition is 30 to 65%, and when the primer composition satisfies the condition 3, a pigment volume concentration (PVC) in the primer composition is 33 to 65%.

<6> A primer coating film formed from the primer composition according to any one of <1> to <5>.

<7> A layered antifouling coating film including: the primer coating film according to <6>; and an antifouling coating film formed on the primer coating film.

<8> The layered antifouling coating film according to <7>, in which the antifouling coating film is a silicone resin-based antifouling coating film.

<9> A method for producing a substrate with a primer coating film, including steps [1] and [2] below:

[1] a step of applying the primer composition according to any one of <1> to <5> to a substrate; and

[2] a step of drying the primer composition applied to form a primer coating film.

<10> A method for producing a substrate with a layered antifouling coating film, the method including steps [i] and [ii] below:

[i] a step of forming a primer coating film from the primer composition according to any one of <1> to <5> on a substrate; and

[ii] a step of forming an antifouling coating film on the primer coating film.

<11> The production method according to <10>, in which the antifouling coating film is a silicone resin-based antifouling coating film.

<12> The production method according to any one of <9> to <11>, in which the substrate is a polyolefin substrate, a polycarbonate substrate, an ABS resin substrate, a styrene butadiene rubber substrate, or an ethylene propylene diene rubber substrate.

Advantageous Effects of Invention

According to one embodiment of the present invention, a primer coating film excellent in adhesion to a plastic substrate can be formed without performing baking treatment by heating, and it is possible to form a primer coating film that, even when an antifouling coating film (particularly, a silicone resin-based antifouling coating film) is formed on the primer coating film, is less likely to generate peeling between the substrate and the primer coating film and between the primer coating film and the antifouling coating film (excellent adhesion to the antifouling coating film).

DESCRIPTION OF EMBODIMENTS

<<Primer Composition>>

The primer composition according to one embodiment of the present invention (hereinafter, also simply referred to as the "present composition") contains an olefin-based resin (A) [hereinafter, also referred to as "component (A)", and the same applies to other components] and a flaky pigment (B), and satisfies any one of the following conditions 1 to 3.

The condition 1: the primer composition contains an organic solvent (C) immiscible with water, the flaky pigment (B) has an average particle size of 25 μm or larger, and the content of the flaky pigment (B) is 17% by mass or higher based on 100% by mass of the solids content in the primer composition The condition 2: the primer composition contains an organic solvent (C) immiscible with water, the flaky pigment (B) has an average particle size of less than 25 μm, and the content of the flaky pigment (B) is 42% by mass or higher based on 100% by mass of the solids content in the primer composition The condition 3: the primer composition contains water (D), the olefin-based resin (A) is a water-based resin, and the content of the flaky pigment (B) is 508 by mass or higher based on 1008 by mass of the solids content in the primer composition In recent years, from the viewpoints of, for example, environmental conservation and safety of a working environment, regulations on the content of volatile organic compounds (VOC) have become strict, and it is desired to switch from a solvent-based composition to an aqueous composition in various compositions.

Since the present composition satisfying the condition 3 can be said to be an aqueous composition, the present composition preferably satisfies the condition 3 from the viewpoints of, for example, environmental conservation and safety of the working environment.

In the present composition, the conditions 1 and 3 may be simultaneously satisfied, or the conditions 2 and 3 may be simultaneously satisfied. In these cases, when the content of water (D) in the composition is less than 58 by mass, the present composition is defined as satisfying the condition 1 or 2, and when the content of water (D) in the composition is 5% by mass or higher, the present composition is defined as satisfying the condition 3.

The pigment volume concentration (PVC) in the present composition is preferably 108 or higher and more preferably 30% or higher, and preferably 60% or less in the case of the condition 1, is preferably 308 or higher and more preferably 35% or higher, and preferably 658 or less and more preferably 60% or less in the case of the condition 2, and is preferably 33% or higher and more preferably 358 or higher, and preferably 65% or less, and more preferably 60% or less in the case of the condition 3, from the viewpoints that, for example, a composition having excellent workability in application can be easily obtained, and a primer coating film excellent in adhesion to a substrate can be easily formed.

In addition to the above effects, PVC in the present composition is preferably 35 to 60%, more preferably 37 to 60%, and particularly preferably 38 to 60% from the viewpoint that, for example, a primer coating film excellent in adhesion to an antifouling coating film can be easily formed.

The PVC refers to the volume concentration of the total pigments (pigments in the component (B) and the following other components) with respect to the volume of the solids content in the present composition. Specifically, the PVC can be calculated from the following formula.

PVC[%]=total volume of all pigments in the present composition×100/volume of solids content in the present composition Note that as used herein, the solids content in the present composition means a heating residue obtained according to JIS K 5601-1-2 (heating temperature: 125° C., heating time: 60 minutes). The solids content in the present composition can also be calculated as an amount excluding the solvent and dispersion medium that can be contained in the raw material used and the organic solvent and dispersion medium (e.g., water) that can be used in preparing the present composition.

The volume of the solids content in the present composition can be calculated from the mass and true density of the solids content in the present composition. The mass and true density of the solids content may be measured values or values calculated from raw materials used.

The volume of the pigment can be calculated from the mass and true density of the pigment used. The mass and true density of the pigment may be measured values or values calculated from raw materials used. For example, the volume of the pigment can be calculated by separating the pigment and other components from the solids content in the present composition and measuring the mass and true density of the pigment separated.

The present composition is preferably a primer composition for (directly) applying to a plastic substrate. The present composition can form a primer coating film excellent in adhesion to such a plastic substrate even when the composition is (directly) applied to the substrate and baking treatment by heating is not performed.

The substrate is preferably a polyolefin substrate, a polycarbonate substrate, an ABS resin substrate, a styrene butadiene rubber substrate, or an ethylene propylene diene rubber substrate from the viewpoint that, for example, the effects of the present invention are further exhibited.

In addition, the present composition is preferably a primer composition for directly applying an antifouling coating material. A primer coating film formed on a plastic substrate usually has reduced adhesion to the substrate when an antifouling coating film is formed thereon. However, according to the present composition, even when an antifouling coating film is formed on a primer coating film formed from the composition, the primer coating film is excellent in adhesion to the substrate, and is also excellent in adhesion to the antifouling coating film.

The present composition is preferably a composition for curing at normal temperature (usually 5 to 35° C.). By using such a present composition for curing at normal temperature, as compared with the case of using a conventional primer composition requiring baking treatment by heating, a primer coating film can be formed at low cost in a simplified step, and the composition can also be applied to a substrate having poor heat resistance. As a result, the degree of freedom in selection of the substrate is increased.

<Olefin-Based Resin (A)>

The component (A) used in the present composition that satisfies the condition 1 or 2 is not particularly limited, and a conventionally known olefin-based resin can be used. The component (A) used in the present composition that satisfies the condition 3 is not particularly limited as long as it is a water-based resin (aqueous olefin-based resin), and a conventionally known water-based resin can be used.

By using the component (A), a primer coating film having excellent adhesion particularly to a plastic substrate can be formed.

One kind or two or more kinds of the component (A) may be used in the present composition.

It is preferable that the component (A) does not substantially contain chlorine. The expression "the component (A) does not substantially contain chlorine" specifically means that the component (A) is not chlorinated.

By using such a component (A) that does not substantially contain chlorine, generation of a harmful gas such as a hydrogen chloride gas can be suppressed even when a substrate having a primer coating film obtained from the present composition is incinerated and discarded.

According to the present composition, even when the component (A) that does not substantially contain chlorine is used, a primer coating film excellent in adhesion to a plastic substrate can be formed.

Examples of the component (A) include olefin-based polymers such as polyethylene, polypropylene, an ethylene-propylene copolymer, and a copolymer of ethylene and/or propylene with one or more other comonomers (e.g., α-olefin, conjugated polyene, non-conjugated polyene, and vinyl compounds such as vinyl acetate); and a modified product of the olefin-based polymer.

Examples of the α-olefin include α-olefins having 4 to 20 carbon atoms such as ethylene, 1-butene, 1-pentene, 1-hexene, 1-heptene, 1-octene, 1-nonene, and 4-methyl-1-pentene.

The component (A) is preferably a modified product of the olefin-based polymer, and more preferably a modified product of at least one olefin-based polymer selected from the group consisting of a propylene-based polymer, an ethylene-propylene-diene copolymer (EPDM), and an ethylene-vinyl acetate copolymer (EVA).

Examples of the propylene-based polymer include a homopolymer of propylene; a copolymer (propylene-based copolymer) of propylene with at least one other α-olefin (α-olefin having preferably 2 to 15, more preferably 2 to 10, and particularly preferably 2, 4 or 5 carbon atoms); and a copolymer (propylene-based copolymer) of propylene with at least one comonomer selected from the group consisting of (meth)acrylic acid, a (meth)acrylic acid derivative, styrene, and a styrene derivative.

The content of the propylene-derived structural unit in the propylene-based copolymer is preferably 50 mol % or higher and more preferably 55 mol % or higher, and preferably 99 mol % or less and more preferably 85 mol % or less.

Examples of the EPDM include copolymers in which the content of the ethylene-derived structural unit is preferably 40 to 75 mol %, the content of the propylene-derived structural unit is preferably 15 to 55 mol %, and the content of the diene-derived structural unit is preferably more than 0 mol % and 10 mol % or less based on 100 mol % in total of the ethylene-derived structural unit, the propylene-derived structural unit, and the diene-derived structural unit.

Examples of the diene include conjugated dienes such as 1,3-butadiene, 1,3-pentadiene, 1,3-octadiene, 1-phenyl-1,3-butadiene, isoprene, 2-ethyl-1,3-butadiene, 2-propyl-1,3-butadiene, 2-octyl-1,3-butadiene, and 2-phenyl-1,3-butadiene; and non-conjugated dienes such as norbornadiene, 5-ethylidene-2-norbornene, cyclopentadiene, 1,4-hexadiene, and methylene norbornene.

Examples of the EVA include copolymers in which the content of the ethylene-derived structural unit is preferably 80 mol % or higher and more preferably 85 mol % or higher, and preferably 99 mol % or less and more preferably 95 mol % or less.

The weight average molecular weight (Mw) of the olefin-based polymer measured by gel permeation chromatography (GPC) is usually 20,000 or larger and preferably 50,000 or larger, and usually 250,000 or less and preferably 200,000 or less from the viewpoints that, for example, a coating material can be easily prepared, and a primer coating film excellent in adhesion to a substrate and solvent resistance can be easily formed.

As the modified product, a modified olefin-based polymer modified with at least one modification component selected from the group consisting of an unsaturated carboxylic acid, an acid anhydride of an unsaturated carboxylic acid, and an ester of an unsaturated carboxylic acid is preferable from the viewpoint that, for example, it can be presumed that a primer coating film having superior adhesion to an antifouling coating film can be formed.

The modified product can be obtained, for example, by graft-modifying the olefin-based polymer according to a conventionally known method using the modification component.

Examples of the unsaturated carboxylic acid include unsaturated monocarboxylic acids and unsaturated polycarboxylic acids (e.g., unsaturated dicarboxylic acids), and specific examples thereof include unsaturated monocarboxylic acids such as linoleic acid, linolenic acid, oleic acid, acrylic acid, and methacrylic acid; and unsaturated polycarboxylic acids such as maleic acid, fumaric acid, itaconic acid, citraconic acid, mesaconic acid, and aconitic acid.

One kind of the unsaturated carboxylic acid may be used, or two or more kinds thereof may be used.

Examples of the acid anhydride of the unsaturated carboxylic acid include acid anhydrides of the unsaturated polycarboxylic acids.

One kind of the acid anhydride of the unsaturated carboxylic acid may be used, or two or more kinds thereof may be used.

Examples of the ester of the unsaturated carboxylic acid include (meth)acrylic acid methyl ester, (meth)acrylic acid ethyl ester, (meth)acrylic acid propyl ester, (meth)acrylic acid butyl ester, (meth)acrylic acid 2-hydroxyethyl ester, (meth)acrylic acid 2-hydroxypropyl ester, (meth)acrylic acid 2-hydroxybutyl ester, (meth)acrylic acid 4-hydroxybutyl ester, (meth)acrylic acid 2-ethylhexyl ester, (meth)acrylic acid lauryl ester, (meth)acrylic acid stearyl ester, (meth) acrylic acid cyclohexyl ester, (meth)acrylic acid tetrahydrofurfuryl ester, (meth)acrylic acid isobornyl ester, (meth) acrylic acid benzyl ester, (meth)acrylic acid glycidyl ester, di(meth)acrylic acid (di)ethylene glycol ester, di(meth) acrylic acid 1,4-butanediol ester, di(meth)acrylic acid 1,6-hexanediol ester, tri(meth)acrylic acid trimethylolpropane ester, and di(meth)acrylic acid glycerol ester.

One kind of the ester of the unsaturated carboxylic acid may be used, or two or more kinds thereof may be used. The term "(meth)acrylic acid" refers collectively to acrylic acid and methacrylic acid, and means one or both of them.

The component (A) preferably includes a structure derived from maleic anhydride and a structure derived from a (meth)acrylic compound from the viewpoint of, for example, being capable of forming a primer coating film superior in adhesion to a plastic substrate and adhesion with an antifouling coating film.

Examples of the (meth)acrylic compound include esters of acrylic acids, methacrylic acids, and unsaturated carboxylic acids.

The modification amount (e.g., graft ratio) in the modified product is preferably 0.18 by mass or larger and more preferably 0.5% by mass or larger, and preferably 10% by mass or less and more preferably 78 by mass or less from the viewpoint that, for example, a primer coating film superior in adhesion to a plastic substrate can be formed.

The modification amount is the mass of the structure derived from the modification component in the modified product, and can be determined by, for example, 1H-NMR measurement.

The melting point of the component (A) measured by a differential scanning calorimeter (DSC) is preferably 50° C. or higher and more preferably 55° C. or higher, and preferably 120° C. or lower and more preferably 75° C. or lower, from the viewpoints that, for example, a composition for curing at normal temperature can be easily formed, and a primer coating film excellent in adhesion to a substrate can be easily formed.

In the present invention, the "aqueous resin" is a resin containing water or water as a main solvent or dispersion medium, or a resin that can be mixed with water (can be diluted with water), and more specific examples thereof include water-dispersible resins, water-soluble resins, and self-emulsifying resins. Such an aqueous resin can be synthesized by a conventionally known method, for example, a solution polymerization method, a suspension polymerization method, an emulsion polymerization method, a seed polymerization method, a miniemulsion polymerization method, a microemulsion polymerization method, or an emulsifier-free (soap-free) emulsion polymerization method. In addition to these, an aqueous resin can also be obtained by a known method, for example, a method of emulsifying an olefin-based resin by, for example, phase inversion emulsification, D phase emulsification, forced emulsification, gel emulsification, inversion emulsification, or high pressure emulsification.

When the component (A) is an aqueous resin and is a water-dispersible resin or a self-emulsifying resin, for example, one in which microresin particles having a particle size of 0.1 to 7 μm are dispersed in a dispersion medium by, for example, an emulsifier or a protective colloid can be used as a raw material of the component (A).

As the component (A), one obtained by synthesis according to a conventionally known method may be used, or a commercially available product may be used. Examples of the commercially available product include Arrowbase manufactured by Unitika Ltd., AUROREN manufactured by Nippon Paper Industries Co., Ltd., ZAIKTHENE and SEPOLSION manufactured by Sumitomo Seika Chemicals Co., Ltd., UNISTOLE manufactured by Mitsui Chemicals, Inc., and HARDLEN manufactured by Toyobo Co., Ltd.

The content (solids content) of the component (A) is preferably 25% by mass or higher and more preferably 30% by mass or higher, and preferably 75% by mass or less and more preferably 55% by mass or less in the case of the above condition 1, is preferably 25% by mass or higher and more preferably 30% by mass or higher, and is preferably 55% by mass or less and more preferably 50% by mass or less in the case of the above condition 2, and is preferably 25% by mass or higher and more preferably 30% by mass or higher, and is preferably 50% by mass or less and more preferably 45% by mass or less in the case of the above condition 3, based on 100% by mass of the solids content in the present composition.

When the content of the component (A) is in the above range, it is possible to easily form a primer coating film which is excellent in adhesion to a substrate and an antifouling coating film, is hardly cracked, and is excellent in a balance between coating film hardness and flexibility (bending resistance).

<Flaky Pigment (B)>

The component (B) is not particularly limited as long as it satisfies the condition 1 or 2, but it is usually an inorganic pigment having a plate-like structure.

By using the component (B) satisfying any one of the conditions 1 to 3, a primer coating film excellent in adhesion to a substrate and an antifouling coating film and excellent in, for example, rust prevention property can be formed.

One kind or two or more kinds of the component (B) may be used in the present composition.

Examples of the component (B) include talc, mica, kaolin, clay, glass flakes, aluminum flakes, scaly iron oxide, stainless steel flakes, and plastic flakes, and talc, mica, glass flakes, and aluminum flakes are preferable, and mica is more preferable from the viewpoints of, for example, being inexpensive and excellent in availability and being capable of forming a primer coating film excellent in adhesion to a substrate and an antifouling coating film.

In the case of the condition 1, the average particle size of the component (B) is preferably 25 μm or larger and more preferably 30 μm or larger, and preferably 200 μm or smaller and more preferably 150 μm or smaller.

In the case of the condition 2, the average particle size of the component (B) is preferably 3 μm or larger and more preferably 5 μm or larger, and preferably smaller than 25 μm and more preferably 20 μm or smaller.

In the case of the condition 3, the average particle size of the component (B) is preferably 3 μm or larger and more preferably 5 μm or larger, and preferably 150 μm or smaller, more preferably 100 μm or smaller, and still more preferably 70 μm or smaller.

When the average particle size of the component (B) under each condition is within the above range, a primer coating film having superior adhesion to a substrate and an antifouling coating film can be formed.

The average particle size of the component (B) can be calculated by measuring the maximum lengths at the main surfaces of 100 random components (B) using a scanning electron microscope (SEM), for example, a "TM 3030 Plus Miniscope" (Tabletop SEM manufactured by Hitachi High-Tech Corporation), and calculating the average value thereof.

Note that the maximum length of the main surface (surface having the largest area) of the component (B) means, for example, the length of a diagonal line when the main surface is quadrangular, the diameter when the main surface is circular, and the length of a major axis when the main surface is elliptical.

Although the average aspect ratio of the component (B) is not particularly limited, it is preferably 2 or larger and more preferably 3 or larger, and preferably 100 or less and more preferably 70 or less.

When the average aspect ratio is in the above range, the component (B) is likely to be horizontally oriented in the primer coating film, whereby a primer coating film excellent in, for example, salt water resistance and moisture resistance can be easily formed.

The aspect ratio of the component (B) can be calculated by measuring the thicknesses and average particle sizes (maximum lengths at the main surfaces) of 100 random components (B) using a scanning electron microscope (SEM), for example, a "TM 3030 Plus Miniscope", and calculating the average value of the ratios (average particle size/thickness).

Note that the thickness of the component (B) can be measured by observing the main surface of the component (B) from the horizontal direction.

When the present composition satisfies the condition 1 or 2, the content of the component (B) in the present composition varies depending on the average particle size measured as described above.

That is, when the average particle size is 25 μm or larger, the content of the component (B) is 17% by mass or higher, preferably 30% by mass or higher, and more preferably 45% by mass or higher, and preferably 75% by mass or less and more preferably 65% by mass or less based on 100% by mass of the solids content in the present composition.

When the average particle size is less than 25 μm, the content of the component (B) is 42% by mass or higher and preferably 45% by mass or higher, and preferably 70% by mass or less and more preferably 65% by mass or less based on 100% by mass of the solids content in the present composition.

When the present composition satisfies the condition 3, the content of the component (B) is 50% by mass or higher and preferably 528 by mass or higher, and preferably 708 by mass or less and more preferably 658 by mass or less based on 100% by mass of the solids content in the present composition.

When the content of the component (B) is within the above range, a primer coating film excellent in adhesion to a substrate and an antifouling coating film and excellent in, for example, salt water resistance and moisture resistance can be easily formed.

<Organic Solvent (C) Immiscible with Water>

The organic solvent (C) that is immiscible with water is not particularly limited as long as it is not miscible with water, and examples thereof include aromatic hydrocarbon-based solvents such as toluene and xylene, ketone-based solvents such as methyl ethyl ketone and methyl isobutyl ketone, ester-based solvents such as butyl acetate, alcohol-based solvents such as benzyl alcohol, and aliphatic hydrocarbon-based solvents such as mineral spirit, n-hexane, n-octane, 2,2,2-trimethylpentane, isooctane, n-nonane, cyclohexane, and methylcyclohexane.

The phrase "immiscible with water" means that in a mixed liquid gently mixed with the same volume of pure water under an environment of 20° C., the mixed liquid cannot maintain a uniform appearance even after the flow of the mixed liquid is stopped.

When the present composition satisfying the condition 1 or 2 contains the organic solvent (C), the content of the organic solvent (C) is preferably 40% by mass or higher and more preferably 508 by mass or higher, and preferably 90% by mass or less and more preferably 858 by mass or less based on 100% by mass of the present composition.

<Water (D)>

The raw material such as the component (A) used in preparing the present composition satisfying the condition 3 may contain water. For this reason, the water contained in the raw material may be water (D), but from the viewpoints that, for example, the preparation of the present composition becomes easier, and the present composition having superior storage stability and workability in application can be easily obtained, it is preferable to further blend water (D) with the present composition satisfying the condition 3 in addition to the water that may be contained in the raw material such as the component (A) used in preparing the present composition.

Water (D) is not particularly limited, and for example, tap water may be used, but water such as ion-exchanged water or deionized water is preferably used.

The content of water in the present composition satisfying the condition 3 (including water that may be contained in a raw material such as the component (A) used in preparing the present composition) is not particularly limited, but is preferably 508 by mass or higher and more preferably 55% by mass or higher, and preferably 70% by mass or less and more preferably 65% by mass or less based on 100% by mass of the present composition.

From the viewpoint that, for example, a desired present composition can be easily obtained, the content of water in the present composition satisfying the condition 3 is preferably 50% by mass or higher, more preferably 70% by mass or higher, and particularly preferably 80% by mass or higher, and preferably 99% by mass or less based on 100% by mass of the total amount of the dispersion medium and the solvent in the present composition.

<Other Components>

The present composition may contain other components other than the components (A) and (B), for example, a pigment other than the component (B), a dispersant, a defoamer, a leveling agent, a thickener, a thixotropic agent (anti-sagging agent/anti-settling agent), a light stabilizer (light absorber), an adhesion enhancer (e.g., organic acid, chelating agent, or silane coupling agent), and/or an organic solvent other than the organic solvent (C), as necessary, as long as the effects of the present invention are not impaired.

Each of the other component may be used singly or two or more kinds thereof.

[Pigments Other than Component (B)]

Examples of the pigment other than the component (B) include extender pigments, coloring pigments, and antirust pigments, and may be either organic or inorganic.

The extender pigment is not particularly limited, and conventionally known pigments can be used, but pigments other than the following coloring pigments and antirust pigments are used.

Examples of the extender pigment include barium sulfate (including precipitated barium sulfate and ground barium sulfate), (potassium) feldspar, alumina white, magnesium carbonate, barium carbonate, calcium carbonate, dolomite, and silica.

When the present composition contains an extender pigment, the content of the extender pigment is preferably an amount that satisfies the range of the PVC, but from the viewpoint that, for example, a primer coating film excellent in flexibility (bending resistance) can be easily formed, the content is preferably 0.1% by mass or higher and more preferably 18 by mass or higher, and preferably 25% by mass or less and more preferably 208 by mass or less based on 100% by mass of the solids content in the present composition.

The coloring pigment is not particularly limited, and conventionally known pigments can be used.

As the coloring pigment, for example, inorganic pigments such as carbon black, titanium oxide (titanium white), red iron oxide (red oxide), yellow iron oxide, black iron oxide, and ultramarine blue, and organic pigments such as cyanine blue and cyanine green can be used. Among them, titanium oxide, red iron oxide, and black iron oxide are preferable.

When the present composition contains a coloring pigment, the content of the coloring pigment is preferably an amount that satisfies the range of the PVC, but is preferably 0.18 by mass or higher and more preferably 18 by mass or higher, and preferably 258 by mass or less and more preferably 208 by mass or less based on 100% by mass of the solids content in the present composition.

Examples of the antirust pigment include zinc powder, zinc alloy powder, a zinc phosphate-based compound, a calcium phosphate-based compound, an aluminum phosphate-based compound, a magnesium phosphate-based compound, a zinc phosphite-based compound, a calcium phosphite-based compound, an aluminum phosphite-based compound, a strontium phosphite-based compound, an aluminum tripolyphosphate-based compound, a molybdate-based compound, a zinc cyanamide-based compound, a borate compound, a nitro compound, and a complex oxide.

[Thixotropic Agent]

As the thixotropic agent, conventionally known thixotropic agents such as organic clay-based waxes such as a stearate, a lecithin salt, and an alkyl sulfonate of Al, Ca, or Zn, polyethylene wax, clay minerals such as bentonite and hectorite, organic waxes such as oxidized polyethylene wax, amide wax, polyamide wax, and hydrogenated castor oil wax, and synthetic fine powder silica can be used, and among them, organic clay-based waxes, clay minerals, oxidized polyethylene wax, amide wax, and synthetic fine powder silica are preferable.

Examples of such a thixotropic agent include "DISPARLON 305", "A630-20X", "DISPARLON 6900-20X", "DISPARLON 4200-20", and "DISPARLON 6650" manufactured by Kusumoto Chemicals, Ltd., "A-S-A D-120", "A-S-A T-250 F", and "A-S-A T-55-20 BX" manufactured by Itoh Oil Chemicals, Co., Ltd., and "Bentone DE" manufactured by Elementis Specialties, Inc.

When the present composition contains a thixotropic agent, the content of the thixotropic agent is preferably 0.1 to 30% by mass based on 100% by mass of the solids content in the present composition.

[Organic Solvent Other than Above Organic Solvent (C)]

The organic solvent other than the organic solvent (C) is not particularly limited, and examples thereof include alcohol-based solvents such as methanol, ethanol, isopropanol, and propylene glycol monomethyl ether.

When the present composition satisfying the condition 1 or 2 contains an organic solvent other than the organic solvent (C), the content of the organic solvent is preferably 1 to 50% by mass based on 1008 by mass of the present composition.

When the present composition satisfies the condition 3, it is preferable to contain a coalescent as an organic solvent other than the organic solvent (C).

The coalescent is not particularly limited, and examples thereof include texanol, ethyl cellosolve, ethylene glycol monobutyl ether (butyl cellosolve), ethylene glycol monobutyl ether, diethylene glycol monobutyl ether (butyl carbitol), and dipropylene glycol monobutyl ether (butyl propylene diglycol).

When the present composition contains the coalescent, the content of the coalescent is preferably 0.1% by mass or higher and more preferably 0.2% by mass or higher, and preferably 30% by mass or less and more preferably 20% by mass or less based on 100% by mass of the present composition.

<Method for Preparing Present Composition>

The present composition can be prepared by mixing (kneading) the respective components.

At the time of this mixing (kneading), the respective components may be added and mixed at a time, or may be added and mixed in plural times. In addition, the components may be mixed while heating or cooling according to, for example, season and environment.

For the mixing (kneading), for example, a conventionally known mixer, disperser, or stirrer can be used, and examples thereof include a disperser, a mixing/dispersing mill, a mortar mixer, a roll, a paint shaker, and a homogenizer.

<<Primer Coating Film, Substrate with Primer Coating Film>>

The present composition is used to form a primer coating film according to one embodiment of the present invention (hereinafter, referred to as the "present coating film"). The present coating film is usually formed on a substrate and used as a layered body containing the present coating film and the substrate (object to be applied) (i.e., substrate with the present coating film). The substrate and the present coating film are preferably in contact with each other from the viewpoint that, for example, the effects of the present invention are further exhibited.

The substrate with the present coating film is preferably produced by a method including the following steps [1] and [2].

Step [1]: a step of applying the present composition to a substrate

Step [2]: a step of drying the applied present composition to form the present coating film The (dried) film thickness of the present coating film is not particularly limited, and may be appropriately selected according to a desired use, but is preferably 3 μm or larger, more preferably 5 μm or larger, and particularly preferably 10 μm or larger, and preferably 50 μm or less, more preferably 40 μm or less, and particularly preferably 35 μm or less from the viewpoints that, for example, the effects of the present invention are sufficiently exhibited and the film formability is excellent.

Examples of the substrate include plastic substrates from the viewpoint that, for example, the effects of the present invention are further exhibited, and a polyolefin substrate, a polycarbonate substrate, an ABS resin substrate, a styrene butadiene rubber substrate, or an ethylene propylene diene rubber substrate is preferable, and a polyolefin substrate, a styrene butadiene rubber substrate, or an ethylene propylene diene rubber substrate is more preferable.

Examples of the polyolefin include (co) polymers obtained by (co) polymerizing one or two or more olefins having 2 to 6 carbon atoms such as ethylene, propylene, and butylene. Polyethylene and polypropylene are preferable, and high density polyethylene (HDPE) and polypropylene are more preferable.

The substrate of the above material is preferably a substrate required to form an antifouling coating film on the surface from the viewpoint that, for example, the effects of the present invention are further exhibited, and examples thereof include structures or devices used in water, such as offshore structures, underwater structures such as water supply and discharge pipes of thermal and nuclear power plants, sea water utilization equipment, megafloats, fishery materials (for examples, rope, fishing net, fishing gear, floats, and buoys), ships, ship equipment, and harbor equipment.

The application method in the step [1] is not particularly limited, and examples thereof include conventionally known methods such as application by spraying, for example, application by airless spraying or application by air spraying, and application using, for example, a brush, a roller, a spatula, or a trowel. Among them, application by spraying is preferable from the viewpoint of, for example, ease of application to a large-area substrate such as the above structure.

The conditions of the application by spraying may be appropriately adjusted according to the (dried) film thickness to be formed, and for example, in the case of application by airless spraying, primary (air) pressure: about 0.1 to 0.4 MPa, secondary (coating material) pressure: about 8 to 15 MPa, and gun moving speed: about 50 to 120 cm/sec are preferable.

When the present composition is applied onto a substrate, for example, treatment for removing, for example, oil, moisture, dust, and/or salt on the substrate may be performed.

When the present composition is applied, the viscosity may be adjusted to an appropriate value as desired.

When the present composition is applied, it is preferable to apply such that the (dried) film thickness of the resulting present coating film falls within the above range. In this case, a coating film having a desired film thickness may be formed by one application (applying once), or may be formed by two or more applications (applying twice or more).

Here, applying twice or more is a method in which a step of forming a dried coating film through the steps [1] and [2] is performed at least once on a substrate, and then, on the dried coating film obtained in the step, a dried coating film is further formed through the steps [1] and [2].

The drying conditions in the step [2] are not particularly limited, and may be appropriately set according to, for example, the method for forming a coating film, the type of the substrate, the use, and the application environment, but the drying temperature is usually 5 to 35° C. in the case of normal temperature drying, and is usually 40° C. or higher and more preferably 50° C. or higher, and is usually 100° C. or lower and more preferably 80° C. or lower in the case of forced drying with, for example, a hot air dryer. The forced drying at such a temperature is different from a so-called baking treatment that is usually performed at a temperature higher than 100° C. According to the present composition, a coating film having excellent adhesion to a plastic substrate can be formed even when the coating film is dried at normal temperature.

The drying time varies depending on the method for drying the coating film, and in the case of normal temperature drying, the drying time is usually half a day or longer and preferably 1 day or longer, and usually 7 days or shorter and preferably 3 days or shorter. In the case of forced drying, the time is preferably 1 hour or longer and more preferably 3 hours or longer, and preferably 12 hours or shorter and more preferably 9 hours or shorter.

<<Layered Antifouling Coating Film and Substrate with Layered Antifouling Coating Film>>

The layered antifouling coating film according to one embodiment of the present invention includes the present coating film and an antifouling coating film formed on the present coating film. An intermediate coating film may be present between the present coating film and the antifouling coating film, but the present coating film and the antifouling coating film are preferably in contact with each other from the viewpoint that, for example, the effects of the present invention are further exhibited. The layered antifouling coating film is usually formed on a substrate, and is used as a layered body containing the substrate, the present coating film, and an antifouling coating film in this order (i.e., substrate with the layered antifouling coating film).

The substrate with the layered antifouling coating film is preferably produced by a method including the following steps [i] and [ii]. This production method can also be said to be an antifouling method for a substrate.

[i] A step of forming the present coating film from the present composition on a substrate

[ii] A step of forming an antifouling coating film on the present coating film

The antifouling coating film is not particularly limited, and examples thereof include antifouling coating films formed from various conventionally known antifouling coating materials such as chlorinated rubber resin-based, vinyl resin-based, hydrated decomposable type, non-organic tin-based hydrolyzable type [for example, metal acrylic resin-based and polyester resin-based], and silicone resin-based antifouling coating materials. Among them, a silicone resin-based antifouling coating film is preferable from the viewpoint that, for example, the effects of the present invention are further exhibited.

Examples of the silicone resin-based antifouling coating film include coating films formed using silicone resin-containing compositions which contain an organopolysiloxane having at least two condensation reactive functional groups, and more specific examples include coating films formed using conventionally known compositions described in, for example, JP 2001-139816 A and JP 2001-181509 A.

The organopolysiloxane is preferably a compound represented by the following formula [α] from the viewpoint that, for example, an antifouling coating film excellent in adhesion to the present coating film can be obtained.

[Chemical Formula 1]

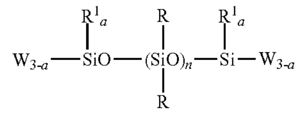

[α]

In the formula [α], W independently represents a hydroxyl group or a hydrolyzable group, $R^1$ and R each independently represent an unsubstituted or substituted monovalent hydrocarbon group having 1 to 12 carbon atoms, n represents an integer of 5 or more, and a represents 0, 1, or 2.

Examples of the monovalent hydrocarbon group include a linear or branched alkyl group, an alkenyl group, an aryl group, a cycloalkyl group, and an aralkyl group.

The weight average molecular weight (Mw) of the organopolysiloxane is preferably 10,000 to 100,000.

The Mw of the organopolysiloxane is measured using gel permeation chromatography (GPC), and calculated in terms of standard polystyrene having a known molecular weight (average molecular weight of polymer).

Note that Mw is a value measured under the following conditions.

(Gpc Conditions)

Apparatus: "HLC-8320GPC" (manufactured by Tosoh Corporation)

Column: "TSKgel guardcolumn SuperMPHZ-M" (manufactured by Tosoh Corporation)×1 column+"TSKgel SuperMultiporeHZ-M" (manufactured by Tosoh Corporation)×2 columns Eluent: tetrahydrofuran (THE)

Flow rate: 0.35 ml/min

Detector: RI

Column thermostat temperature: 40° C.

Standard substance: polystyrene

GPC measurement sample: filtrate obtained by adding an eluent to organopolysiloxane (solution) and then filtering through a membrane filter The (dried) film thickness of the antifouling coating film is not particularly limited, may be appropriately selected according to a desired use, and is, for example, about 100 to 1,000 μm.

Specific examples of the step [i] include steps including the steps [1] and [2].

As a preferred example of the step [ii], there is a step of applying an antifouling coating material onto the present coating film, then drying the applied antifouling coating material, and curing the antifouling coating material as necessary.

Examples of the method for applying the antifouling coating material include the same method as the above-described method for applying the present composition.

As a drying method, there is a method of leaving the applied coating material at normal temperature for preferably about 0.5 days or longer and more preferably about 1 day or longer, and preferably about 14 days or shorter and more preferably about 7 days or shorter. The drying may be performed under heating or may be performed while air is being blown.

EXAMPLES

One embodiment of the present invention will be described in more detail with reference to examples, but the present invention is not limited thereto.

Examples 1 to 17 and Comparative Examples 1 to 13

Into a container, each component described in Tables 1 to 3 was placed according to the amount (numerical value) described in Tables 1 to 3, and sufficiently mixed using a high speed disperser to prepare a primer composition.

The numerical values for the respective components in Tables 1 to 3 are expressed in parts by mass. Note that Table 4 shows the description of each component described in Tables 1 to 3.

<Adhesion 1>

The primer composition obtained in each of the examples and the comparative examples was applied by spraying to a high density polyethylene plate (substrate) so as to have a dried film thickness of 10 μm, and dried at room temperature for 1 day. Thereafter, "BIOCLEAN ECO" (manufactured by Chugoku Marine Paints, Ltd.) as a silicone resin-based antifouling coating material was applied by spraying onto the obtained primer coating film so as to have a dried film thickness of 150 μm to laminate an antifouling coating film, thereby preparing a substrate with a layered antifouling coating film.

When a straight line cut reaching the substrate from the antifouling coating film side was made in the prepared substrate with a layered antifouling coating film, and the cut portion was rubbed 20 times with a paper waste, the degree of occurrence of peeling of the coating film (primer coating film or antifouling coating film) from the substrate with a layered antifouling coating film was evaluated on a five-point grading scale according to the following evaluation criteria. The results are shown in Table 1.

(Evaluation Criteria)

5: Except for the cut portion, no damage was observed in the coating film (peeling of the coating film does not occur at all).

4: Peeling of the coating film occurred, and the length of peeling at that time was in the range of shorter than 1 mm from the cut portion.

3: Peeling of the coating film occurred, and the length of peeling at that time was in the range of 1 mm or longer and shorter than 3 mm from the cut portion.

2: Peeling of the coating film occurred, and the length of peeling at that time was in the range of 3 mm or longer and shorter than 10 mm from the cut portion.

1: Peeling of the coating film occurred, and the length of peeling at that time was in the range of 10 mm or longer from the cut portion.

TABLE 1

| | Example | | | | | | |
|---|---|---|---|---|---|---|---|
| | 1 | 2 | 3 | 4 | 5 | 6 | 7 |
| Resin (A1) | 91.3 | 87.0 | 83.0 | 76.0 | 72.0 | 83.0 | 83.0 |
| Flaky pigment (B1) | 3.7 | 5.5 | 10.0 | 15.0 | 15.0 | 10.0 | |
| Flaky pigment (B2) | | | | | | | 10.0 |
| Flaky pigment (B3) | | | | | | | |
| Flaky pigment (B4) | | | | | | | |
| Flaky pigment (B5) | | | | | | | |
| Flaky pigment (B6) | | | | | | | |
| Flaky pigment (B7) | | | | | | | |
| Fused Silica | | | | | | | |
| Ground barium sulfate | | | | | | | |
| Red iron oxide | 1.7 | 2.5 | 2.5 | 2.5 | 2.5 | | 2.5 |
| Titanium oxide | | | | | | 2.3 | |
| Black iron oxide | | | | | | 0.2 | |
| Thixotropic agent 1 | 1.3 | 2.0 | 1.5 | 3.5 | 10.0 | 1.5 | 1.5 |
| Toluene | 2.0 | 3.0 | 3.0 | 3.0 | 0.5 | 3.0 | 3.0 |
| Content of (B) with respect to solids content in composition (%) | 19.0 | 25.6 | 39.6 | 50.7 | 49.5 | 39.6 | 39.6 |
| Condition | Cond. 1 | Cond. 1 | Cond. 1 | Cond. 1 | Cond. 1 | Cond. 1 | Cond. 1 |
| PVC (%) | 14.8 | 21.2 | 32.1 | 41.2 | 38.4 | 32.6 | 32.1 |
| Adhesion 1 | 5 | 5 | 5 | 5 | 5 | 5 | 5 |

| | Example | | | | | |
|---|---|---|---|---|---|---|
| | 8 | 9 | 10 | 11 | 12 | 13 |
| Resin (A1) | 79.5 | 83.0 | 72.0 | 83.0 | 85.0 | 76.0 |
| Flaky pigment (B1) | | | | | | |
| Flaky pigment (B2) | | | | | | |
| Flaky pigment (B3) | 16.0 | | | | | |
| Flaky pigment (B4) | | 10.0 | | | | |
| Flaky pigment (B5) | | | 15.0 | | | |
| Flaky pigment (B6) | | | | 10.0 | | |
| Flaky pigment (B7) | | | | | 12.0 | 15.0 |
| Fused Silica | | | | | | |
| Ground barium sulfate | | | | | | |
| Red iron oxide | | 2.5 | 2.5 | 2.5 | 2.5 | 2.5 |
| Titanium oxide | | | | | | |
| Black iron oxide | | | | | | |
| Thixotropic agent 1 | 1.5 | 1.5 | 10.0 | 1.5 | 0.5 | 3.5 |
| Toluene | 3.0 | 3.0 | 0.5 | 3.0 | | 3.0 |
| Content of (B) with respect to solids content in composition (%) | 47.6 | 39.6 | 49.5 | 39.6 | 43.9 | 50.7 |
| Condition | Cond. 1 | Cond. 1 | Cond. 2 | Cond. 1 | Cond. 2 | Cond. 2 |
| PVC (%) | 33.3 | 32.1 | 39.6 | 34.5 | 36.9 | 42.4 |
| Adhesion 1 | 5 | 5 | 5 | 5 | 5 | 5 |

| | Comparative example | | | | | | |
|---|---|---|---|---|---|---|---|
| | 1 | 2 | 3 | 4 | 5 | 6 | 7 |
| Resin (A1) | 100.0 | 93.5 | 89.0 | 83.0 | 83.0 | 83.0 | 83.0 |
| Flaky pigment (B1) | | 2.8 | | | | | |
| Flaky pigment (B2) | | | | | | | |
| Flaky pigment (B3) | | | | | | | |
| Flaky pigment (B4) | | | | | | | |
| Flaky pigment (B5) | | | | | | | 10.0 |
| Flaky pigment (B6) | | | | | | | |
| Flaky pigment (B7) | | | 7.0 | 10.0 | | | |
| Fused Silica | | | | | 10.0 | | |
| Ground barium sulfate | | | | | | 10.0 | |
| Red iron oxide | | 1.2 | 2.5 | 2.5 | 2.5 | 2.5 | 2.5 |
| Titanium oxide | | | | | | | |
| Black iron oxide | | | | | | | |
| Thixotropic agent 1 | | 1.0 | 1.5 | 1.5 | 1.5 | 1.5 | 1.5 |
| Toluene | | 1.5 | | 3.0 | 3.0 | 3.0 | 3.0 |
| Content of (B) with respect to solids content in composition (%) | 0 | 15.1 | 30.2 | 39.6 | 0 | 0 | 39.6 |

TABLE 1-continued

| | | | | | | | |
|---|---|---|---|---|---|---|---|
| Condition | X | X | X | X | X | X | X |
| PVC (%) | 0 | 11.4 | 25.4 | 33.1 | 37.3 | 24.9 | 33.1 |
| Adhesion 1 | 1 | 1 | 1 | 1 | 1 | 1 | 3 |

<Adhesion 2>

The degree of occurrence of peeling of the coating film from the substrate with a layered antifouling coating film was evaluated in the same manner as in Adhesion 1 except that "CMP BIOCLEAN R" (manufactured by Chugoku Marine Paints, Ltd.), which is a silicone resin-based antifouling coating material, was used instead of BIOCLEAN ECO in the test for Adhesion 1. The results are shown in Tables 2 and 3.

TABLE 2

| | Example | | | |
|---|---|---|---|---|
| | 4 | 5 | 10 | 13 |
| Resin (A1) | 76.0 | 72.0 | 72.0 | 76.0 |
| Flaky pigment (B1) | 15.0 | 15.0 | | |

TABLE 2-continued

| | Example | | | |
|---|---|---|---|---|
| | 4 | 5 | 10 | 13 |
| Flaky pigment (B5) | | | 15.0 | |
| Flaky pigment (B7) | | | | 15.0 |
| Red iron oxide | 2.5 | 2.5 | 2.5 | 2.5 |
| Thixotropic agent 1 | 3.5 | 10.0 | 10.0 | 3.5 |
| Toluene | 3.0 | 0.5 | 0.5 | 3.0 |
| Content of (B) with respect to solids content in composition (%) | 50.7 | 49.5 | 49.5 | 50.7 |
| Condition | Cond. 1 | Cond. 1 | Cond. 2 | Cond. 2 |
| PVC (%) | 41.2 | 38.4 | 39.6 | 42.4 |
| Adhesion 1 | 5 | 5 | 5 | 5 |
| Adhesion 2 | 5 | 5 | 5 | 5 |

TABLE 3

| | Example | | | | Comparative example | | | | | |
|---|---|---|---|---|---|---|---|---|---|---|
| | 14 | 15 | 16 | 17 | 8 | 9 | 10 | 11 | 12 | 13 |
| Resin (A2) | 40.0 | 40.0 | 40.0 | 42.0 | 100.0 | 46.5 | 46.5 | 52.0 | 40.0 | 40.0 |
| Flaky pigment (B1) | 20.0 | | | | | 17.5 | | | | |
| Flaky pigment (B2) | | 20.0 | | | | | 17.5 | | | |
| Flaky pigment (B4) | | | 20.0 | | | | | | | |
| Flaky pigment (B7) | | | | 22.0 | | | | 18.0 | | |
| Fused Silica | | | | | | | | | 20.0 | |
| Ground barium sulfate | | | | | | | | | | 20.0 |
| Red iron oxide | 4.5 | 4.5 | 4.5 | 4.5 | | 4.5 | 4.5 | 4.5 | 4.5 | 4.5 |
| Dispersant | 2.5 | 2.5 | 2.5 | 2.5 | | 2.5 | 2.5 | 2.5 | 2.5 | 2.5 |
| Defoamer | 0.2 | 0.2 | 0.2 | 0.2 | | 0.2 | 0.2 | 0.2 | 0.2 | 0.2 |
| Thixotropic agent 2 | 0.2 | 0.2 | 0.2 | 0.2 | | 0.2 | 0.2 | 0.2 | 0.2 | 0.2 |
| Thickener | 0.1 | 0.1 | 0.1 | 0.1 | | 0.1 | 0.1 | 0.1 | 0.1 | 0.1 |
| Coalescent | 2.4 | 2.4 | 2.4 | 2.4 | | 2.4 | 2.4 | 2.4 | 2.4 | 2.4 |
| Water | 30.1 | 30.1 | 30.1 | 26.1 | | 26.1 | 26.1 | 20.1 | 30.1 | 30.1 |
| Content of (B) with respect to solids content in composition (%) | 53.0 | 53.0 | 53.0 | 54.5 | 0.0 | 47.0 | 47.0 | 45.7 | 0.0 | 0.0 |
| Condition | Cond. 3 | Cond. 3 | Cond. 3 | Cond. 3 | X | X | X | X | X | X |
| PVC (%) | 35.8 | 35.8 | 35.8 | 37.8 | 0 | 30.1 | 30.1 | 29.4 | 41.2 | 28.1 |
| Adhesion 1 | 4 | 4 | 5 | 5 | 1 | 1 | 1 | 1 | 1 | 2 |

TABLE 4

| | | |
|---|---|---|
| Resin (A1) | Auroren 200T | Manufactured by Nippon Paper Industries Co., Ltd. (polyolefin-based resin, solids content 15%) |
| Resin (A2) | Auroren AE-202 | Manufactured by Nippon Paper Industries Co., Ltd. (aqueous polyolefin-based resin, solids content 30%) |
| Flaky pigment (B1) | Suzorite Mica 200-HK | Manufactured by Suzorite Mining Inc. (phlogopite, average particle size 65 μm) |
| Flaky pigment (B2) | Suzorite Mica 325-HK | Manufactured by Suzorite Mining Inc. (phlogopite, average particle size 35 μm) |
| Flaky pigment (B3) | Al-paste 0638-70C | Manufactured by Toyo Aluminium K.K. (aluminum paste, average particle size 50 μm) |
| Flaky pigment (B4) | Mica Powder 100 mesh | Manufactured by Fukuoka Talc Co., LTD. (muscovite, average particle size 33 μm) |
| Flaky pigment (B5) | Mica Powder 325 mesh | Manufactured by Fukuoka Talc Co., LTD. (muscovite, average particle size 17 μm) |
| Flaky pigment (B6) | Glass Flake RCF-140 | Manufactured by Nippon Sheet Glass Co., Ltd. (glass flakes, average particle size 120 μm) |
| Flaky pigment (B7) | Talc FC-1 | Manufactured by Fukuoka Talc Co., LTD. (talc, average particle size 7 μm) |

TABLE 4-continued

| | | |
|---|---|---|
| Fused Silica | Fused Silica CB-5 | Manufactured by Kinsei Matec Co., Ltd. (non-flaky, average particle size 5 μm) |
| Ground barium sulfate | Barico 300W | Manufactured by Hakusui Tech. Co., Ltd. (non-flaky, average particle size 1 μm) |
| Red iron oxide | TODA COLOR NM-50 | Manufactured by Toda Pigment Corp. (non-flaky) |
| Titanium oxide | Tipaque R-930 | Manufactured by Ishihara Sangyo Kaisha, Ltd. (non-flaky) |
| Black iron oxide | TODA COLOR KN-320 | Manufactured by Toda Pigment Corp. (non-flaky) |
| Thixotropic agent 1 | ASA D-120 | Manufactured by Itoh Oil Chemicals, Co., Ltd. (oxidized polyethylene wax, solids content 20%) |
| Thixotropic agent 2 | Bentone DE | Manufactured by Elementis Specialties, Inc. (bentonite-based compound thixotropic agent) |
| Thickener | Rheolate 288 | Manufactured by Elementis Specialties, Inc. (polyether polyurethane associative thickener) |
| Dispersant | Disperbyk-190 | Manufactured by BYK Japan KK (water-based wetting and dispersing additive) |
| Defoamer | TEGO Airex 902W | Manufactured by Evonik Industries AG (emulsion type defoamer, solids content 20%) |
| Coalescent | BFDG | Manufactured by Nippon Nyukazai Co., Ltd. (butyl propylene diglycol, boiling point 231° C.) |

A primer coating film formed on a plastic substrate usually has reduced adhesion to the substrate when an antifouling coating film is formed thereon. However, it has been found that according to the present composition, even when an antifouling coating film is formed on a primer coating film formed from the composition, the primer coating film is excellent in adhesion to the substrate, and is also excellent in adhesion with the antifouling coating film.

The invention claimed is:

1. A primer composition, comprising:

an olefin-based resin (A); and a flaky pigment (B), wherein the olefin-based resin (A) comprises substantially no chlorine, the olefin-based resin (A) is at least one selected from the group consisting of olefin-based polymers selected from the group consisting of polyethylene, polypropylene, an ethylene-propylene copolymer, and a copolymer of ethylene and/or propylene with at least one other comonomers; and a modified product of the olefin-based polymer, and a modification amount in the modified product is from 0.1% by mass 10% by mass, wherein the primer composition satisfies (1) or (3):

(1) the primer composition comprises an organic solvent (C) immiscible with water, the flaky pigment (B) has an average particle size of at least 25 μm, and a content of the flaky pigment (B) is at least 17% by mass, based on 100% by mass of a solids content in the primer composition; or (3) the primer composition comprises water (D), the olefin-based resin (A) is a water-based resin, and a content of the flaky pigment (B) is at least 50% by mass, based on 100% by mass of the solids content in the primer composition.

2. The primer composition of claim 1, wherein the flaky pigment (B) is at least one selected from the group consisting of talc, mica, glass flakes, and aluminum flakes.

3. The primer composition of claim 1, wherein the olefin-based resin (A) comprises, in polymerized form, maleic anhydride and a (meth)acrylic compound.

4. The primer composition of claim 1, satisfying (1) and having a pigment volume concentration (PVC) in the primer composition of from 10 to 60%.

5. A primer coating film, formed from the primer composition of claim 1.

6. A layered antifouling coating film, comprising:

the primer coating film of claim 5; and an antifouling coating film formed on the primer coating film.

7. The layered antifouling coating film of claim 6, wherein the antifouling coating film is a silicone resin-based antifouling coating film.

8. A method for producing a substrate with a primer coating film, the method comprising:

applying the primer composition of claim 1 to a substrate; and drying the primer composition applied to form a primer coating film.

9. A method for producing a substrate with a layered antifouling coating film, the method comprising:

forming a primer coating film from the primer composition of claim 1 on a substrate; and forming an antifouling coating film on the primer coating film.

10. The method of claim 9, wherein the antifouling coating film is a silicone resin-based antifouling coating film.

11. The method of claim 8, wherein the substrate comprises polyolefin, polycarbonate, ABS resin, styrene butadiene rubber, or ethylene propylene diene rubber.

12. The primer composition of claim 1, satisfying (1).

13. The primer composition of claim 1, satisfying (3).

14. The primer composition of claim 1, satisfying (3) and having a pigment volume concentration (PVC) in the primer composition of from 33 to 65%.

* * * * *